United States Patent
Nordeman et al.

(10) Patent No.: US 6,363,249 B1
(45) Date of Patent: Mar. 26, 2002

(54) DYNAMICALLY CONFIGURABLE DATAGRAM MESSAGE COMMUNICATION SYSTEM

(75) Inventors: Roger D. Nordeman, Coral Springs; Robert A. Marples, Sunrise; Todd M. Russell, Plantation, all of FL (US); Erel Tal, Plainsboro, NJ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/546,021

(22) Filed: Apr. 10, 2000

(51) Int. Cl.[7] ................................. H04M 3/00
(52) U.S. Cl. ................. 455/418; 455/561; 455/560; 455/466
(58) Field of Search ................. 455/418, 419, 455/466, 412, 426, 31.3, 561, 552, 414, 454, 465

(56) References Cited

U.S. PATENT DOCUMENTS

| | | | | |
|---|---|---|---|---|
| 5,742,668 A | * | 4/1998 | Pepe et al. ............... 455/415 |
| 5,838,252 A | * | 11/1998 | Kikinis ................. 340/825.44 |
| 5,872,926 A | * | 2/1999 | Levac et al. ........... 395/200.36 |
| 6,023,620 A | * | 2/2000 | Hansson .................... 455/419 |
| 6,108,534 A | * | 8/2000 | Bourgeois et al. .......... 455/419 |

* cited by examiner

*Primary Examiner*—Nay Maung
*Assistant Examiner*—Charles Craver
(74) *Attorney, Agent, or Firm*—Scott M. Garrett

(57) ABSTRACT

A wireless message communication system (11) delivers dynamically configurable datagram messages between a server (15) and subscriber units (17, 18, 19, 20, 21, 22). The server (15) queries a subscriber unit (17) for its data capability profile, such as supported data types, number of data fields, size of each data field, and data type for each data field. The server (15) and the subscriber unit (17) dynamically configure a message datagram (200) to conform message information in transmitted data to the data capability profile of the subscriber unit (17). The server (15) and the subscriber unit (17) then wirelessly communicate a message containing message data packets arranged and formatted according to the message datagram (200).

10 Claims, 5 Drawing Sheets

DYNAMICALLY CONFIGURABLE DATAGRAM MESSAGE COMMUNICATION SYSTEM

TECHNICAL FIELD

This invention relates in general to wireless message communication systems, and more particularly to configurable datagram messaging between a server and subscriber units in a wireless message communication system.

DESCRIPTION OF THE PRIOR ART

Some conventional wireless message communication systems utilize a fixed datagram message in a communication protocol for transmitting message information between a server and subscriber units. The datagram size is normally set by the manufacturer of the subscriber unit based on a fixed memory size for the subscriber unit and fixed data element locations in the memory, and further on fixed data types and fixed data size per data element transmitted in the message. The type of information stored in memory for each data element and the size of each data element in memory has been normally fixed by the manufacturer of the subscriber unit. Therefore, the configuration of a message datagram is typically preset at a factory for each subscriber unit and is configured in each subscriber unit at the factory by a direct wired connection with the subscriber unit.

After configuration of each subscriber unit, a server for a communication system is also configured to communicate with each of the subscriber units according to the particular subscriber unit constraints. This configuration is typically done by technician manual entry into a server database for each subscriber unit. Subsequently, communication of message information from the server to a particular subscriber unit is handled via a message formatted according to a system-wide fixed datagram and using a communication protocol to wirelessly transmit message information to the subscriber unit in the communication system. Message information that is wirelessly received by a subscriber unit and determined not relevant to the particular subscriber unit is considered excess information and ignored by the particular subscriber unit while continuing to receive the remainder of a message. Unfortunately, the transmission of excess information that is not usable by particular subscriber units is inefficient and wastes precious bandwidth of a wireless communication channel. Further, each particular subscriber unit operates more than necessary to selectively receive and store its relevant message information that conforms to its particular constraints for memory and data storage therein. This tends to waste resources at the subscriber units, such as wasting battery power in battery operated units. Long battery life is a very important attribute for consumers of portable communication devices.

With the advent of more powerful processors and larger amounts of memory in subscriber units, there is a need to allow a more flexible means of delivering message information to such subscriber units, where the data capability and memory size of each subscriber unit can vary between subscriber units as well as over time for a particular subscriber unit. Thus, there is a need for enhancing the message information delivery efficiency of a wireless message communication system while allowing flexible handling of varying data configurations and formats for subscriber units.

SUMMARY OF THE INVENTION

The invention disclosed according to its inventive principles, achieves an efficiency in the wireless transmission of message data between a server and subscriber units where the amount and type of data useful to the various subscriber units varies. In order to achieve this efficiency, each transmission is adapted to the respective subscriber unit's data capability profile, such as supported data types, number of data elements, size of each data element, and data type for each data element. Using wireless message communication, the server queries each subscriber unit and receives a data capability profile from the subscriber unit. By being able to store and update the data capability profile for each subscriber unit served by a server, the transmitted message information between the server and each subscriber unit may be personalized according to the subscriber unit's data capability profile.

DESCRIPTION OF THE PREFERRED EMBODIMENTS

Figure 1:
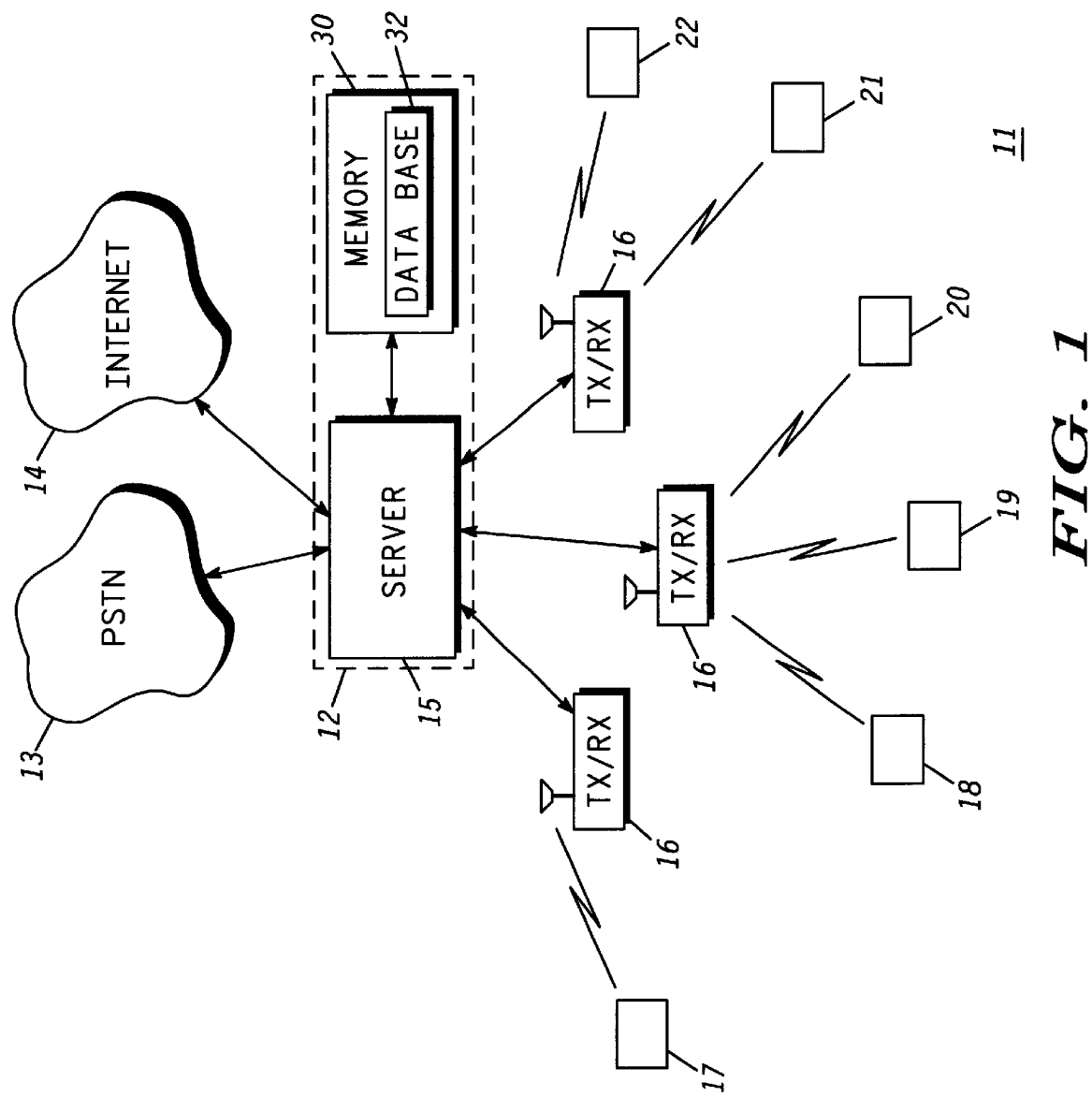
FIG. 1 is a block diagram illustrating an exemplary message communication system for wireless transmission of messages between a server and a plurality of subscriber units according to a preferred embodiment of the present invention.

According to a preferred embodiment of the present invention as illustrated generally in FIG. 1, a wireless communication system 11, includes a central station 12 coupled to a telephone system, such as via a public switched telephone system (PSTN) 13, and/or connected to a wide area network such as the Internet shown as 14. The server 15 in the central station 12, in this example, is coupled to at least one RF transceiving basestation 16 for wireless communication with subscriber units shown as 17 to 22. These subscriber units preferably comprises wireless transceivers for two-way communication with the at least one RF transceiving basestation 16. The central station 12, as shown for the preferred embodiment, includes the server 15 coupled to a memory 30. The memory 30 contains a database 32 for keeping track of data capability profile information for the subscriber units 17 to 22 in the communication system 11, as will be discussed in more detail below.

This exemplary two-way communication system 11, as would be known to one of ordinary skill in the art, may be varied as to the placement, number, arrangement, and communication capability of the various components without departing from the principles of the present invention. The communication system 11 may wirelessly communicate with cellular telephones, two-way communicators, two-way pagers, and two-way radios, in accordance with alternative preferred embodiments of the present invention. The communications between the central station 12 and the subscriber units 17 to 22, in the present example, may be provided by an iDEN™ communication network that uses a combination of wireless technologies to bring together the features of dispatch radio, full-duplex telephone interconnect, short messaging, and data transmission. An exemplary subscriber unit 17 capable of operating in the iDEN communication network may be provided by the i1000 Plus two-way communicator. The iDEN communication network and the i1000 Plus are illustrative for operating according to a preferred embodiment of the present invention and are manufactured and distributed by Motorola, Inc., of Schaumburg, Ill., U.S.A.

Figure 2:
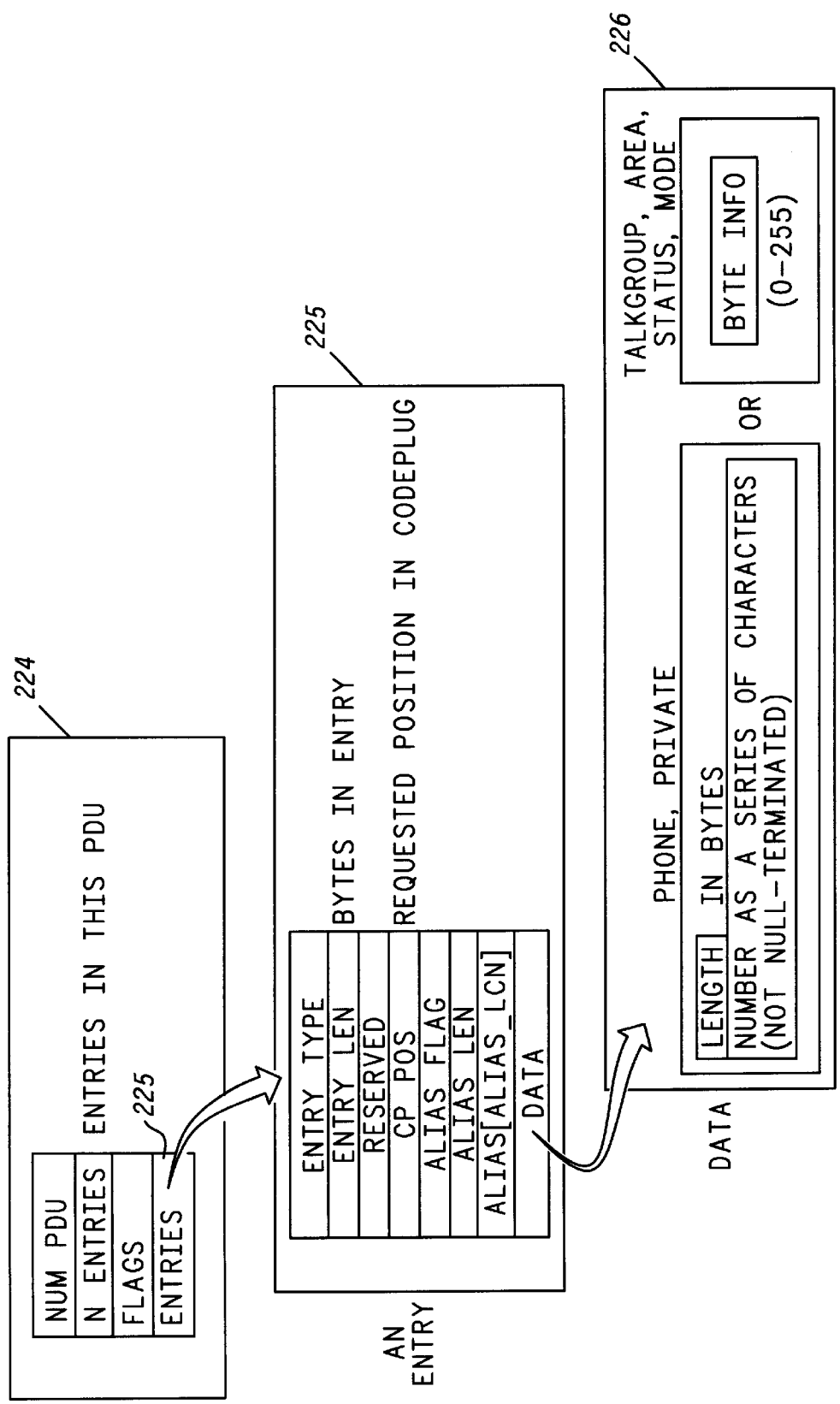
FIG. 2 illustrates an example of a dynamically configurable datagram for transmission of message information between a server and a subscriber unit according to a preferred embodiment of the present invention.

Referring to FIG. 2, an exemplary dynamically configurable datagram 200 for a message is illustrated for use in message communication between the server 15 and the subscriber units 17 to 22. The datagram 200 defines the overall format of transmitted data packets, including such parameters as the overall size of each data packet, the types of data that are contained in each data packet, the fields of information that are contained in a data packet, the type of data in each field, the size of the data in each field, and the overall number of fields in a data packet, and other related information necessary to fully define the format of data packets being wirelessly transmitted according to a communication protocol.

One or more data packets are transmitted within a message. The message is transmitted between the server 15 and a particular subscriber unit 17, or a group of subscriber units 17 to 22 that share the common datagram definition. The data packets transmitted according to this predefined datagram 200 are customized for the specific data capability profile of each of the at least one subscriber unit 17 to 22 communicating messages with the server 15 according to the datagram 200. Because the message information is organized and delivered according to the specific data capabilities of a subscriber unit, for example as shown by 17, excess data that would normally be ignored by the subscriber unit 17 because of internal constraints of the subscriber unit 17 such as a maximum entry length is not transmitted. This is very valuable in conserving channel bandwidth and transmission time for messages being delivered across a wireless communication channel. Wireless communication channels normally have narrow bandwidth. By communicating only relevant message data with a subscriber unit 17, with no excess data transmitted into the channel, there is more bandwidth available to support more message data from other communication with other subscriber units, for example as shown as 18 to 22. This increases the number of subscribers that can be supported by a single communication channel and therefore increases the commercial viability of a wireless communication system 11.

Additionally, the subscriber unit 17 does not have to monitor lengthy message information to selectively communicate the information which is relevant to its data capability profile. That is, substantially only the relevant message information for each subscriber unit 17 is transmitted according to the datagram 200 for the particular subscriber unit 17. This saves significant resources at the subscriber unit 17 and system 11, resulting in reduced power consumption of a battery, increased CPU cycles to perform other functions, and increased communication channel data bandwidth.

The datagram 200 is dynamically configurable and customizable according to information received at the server 15 from each particular subscriber unit 17. This normally involves a query message handshake between the server 15 and the particular subscriber unit 17. This query can be performed at any point in time after the manufacture of each subscriber unit 17 such as during operation of a wireless communication system 11. The system 11 can send, for example, a query message to a particular subscriber unit and then receive a response message from the subscriber unit detailing the data capability profile for the particular subscriber unit. This handshaking can take place, for example, during a system 11 configuration sequence such as after manufacturer of the subscriber units 17 to 22 but before being placed into service in a communication system 11.

Additionally, handshaking to dynamically reconfigure a datagram 200 for communicating messages with particular subscriber units 17 to 22 can occur at any time during normal operation of a communication system 11. For example, just prior to transmission of a series of long messages to certain subscriber units 17 to 22 in the communication system 11, the server can query each of the subscriber units 17 to 22 to determine the data capability profile thereof. Subsequently, the server 15 transmits a long sequence of messages to the subscriber units 17 to 22 in the most efficient manner possible, i.e., reducing the amount of excess data transmitted, based on the specific memory configuration and data capability profiles of the subscriber units 17 to 22. If the data capability profile for all of the units 17 to 22 is the same then the efficiency of transmission approaches 100% because only relevant message information for all the subscriber units 17 to 22 is transmitted in the messages. On the other hand, if the data capability profile of different subscriber units 17 to 22 in a group varies from unit to unit, then the server 15 can reconcile the different profiles to provide a common dynamically configurable datagram 200 for the group. This datagram 200 minimizes the amount of wasted excess information that has to be communicated between the subscriber units 17 to 22 and the server 15 due to any message transmitted.

An example of a datagram 200 for a message is illustrated in FIG. 2 in connection with a preferred embodiment of the present invention. As would be known to one of ordinary skill in the art, the inventive principles are not limited to the data structure of the datagram 200 shown in FIG. 2, but may be applied to any similar data structure defining the size, content, or configuration of the data message transmission between a server 15 and subscriber units 17 to 22 as shown in FIG. 1.

For the example shown in FIG. 2, the datagram 200 which is arranged for the transmission of only the relevant message data between a server 15 and a subscriber unit, for example subscriber unit 17, is represented as shown as successive levels 224, 225, and 226. This datagram 200 indicates the data structure of a message data packet to be transmitted between the server 15 and the subscriber unit 17. As would be understood by those of ordinary skill in the art, the particular data constraints indicated by this exemplary datagram 200 are not limiting of the principles of the present invention but serve only to illustrate a preferred embodiment thereof.

In operation, a data packet would be wirelessly transmitted with data fields containing information according to the datagram 200, as shown in FIG. 2. The data packet contains an identification field for the data packet, i.e., NUM PDU, which helps the server 15 and the subscriber unit 17 to track a sequence of data packets transmitted therebetween. Then, a data field, i.e., N ENTRIES, indicates the total number of data fields being transmitted in this particular data packet. The FLAGS data field indicates status for a variety of conditions relating to the data packet and the communication between the server 15 and the subscriber unit 17. Following these initial data fields, data fields comprising ENTRIES 225 are included in the data packet.

Each of the ENTRIES 225 comprises data fields as shown in the second level of the datagram 200. There is a data entry type (ENTRY TYPE), data entry length (ENTRY LENGTH, an indication, CP POS, of the location in the memory of the subscriber unit 17 where the entry is normally stored, an ALIAS FLAG that indicates status for a variety of conditions relating to the data entry, an alias length indicating the length of the data associated with this entry, followed by the message data (DATA)associated with this data entry in the message packet.

As illustrated in the third level 226 of the datagram 200, the data entry in the data packet contains a variety of message data as defined by the dynamically configurable datagram 200. For example, it can contain phone number information of a predefined length and range of values. It may alternatively contain address book entries with ASCII text information of a predefined length and range of values. An exemplary use of the data entries in the message packet could be for telephone and dispatch alias lists. Other types of data information may be predefined in the datagram 200 to precisely identify data types, size, and ranges of values, that can be stored in a memory of a subscriber unit 17 and that can be transmitted in the data packet between the server 15 and the subscriber unit 17, as can be appreciated by those having ordinary skill in the art.

As explained above, the efficient transmission of data is improved when reduced to the relevant message data customized for at least one particular subscriber unit 17 according to the dynamically configurable datagram 200. Additionally, according to the inventive principles as disclosed in connection with a preferred embodiment of the present invention, by using the datagram 200 to reconfigure the memory of the subscriber unit 17 the server 15 would be able to remotely specify the subscriber unit memory location where message data is to be placed and the formatting of the data. An advantage of this feature of the invention is that changes in memory location and formatting could be made for each subscriber unit 17 at the server 15 and in the server application, instead of requiring these changes to be made at the subscriber unit 17 in the subscriber software. A following advantage is its use with any application that operates by changing the subscriber memory as it may be arranged to store the data transmission according to the application requirements.

According to the preferred embodiment of the present invention, the configurable datagram 200 also permits a variable data protocol. By tracking protocol information at the server 15 for each respective subscriber unit 17, each subscriber unit 17 can maintain a single protocol sufficient for its data and transmission constraints. In this way, protocol changes made at the subscriber unit 17 or the introduction of new subscriber units can be accommodated at the server 15 by adjusting the data transmission to the requirements of the target subscriber unit. Further, the availability of a new protocol in the system 11 or an upgrade in the subscriber unit 17 that permits taking advantage of a more advantageous protocol can be conveniently updated by wireless communication between the subscriber unit 17 and the server 17. By storing at the server 15, the individual subscriber unit's data configuration profile, a variety of subscriber unit 17 operations may be performed at the server 15 level. For example, systems administration may be performed at the server 15 level, all or a part of the data in a particular data transmission may be transmitted and a variety of applications may be supported at the server 15 level such as data restoration, merges with new data, debugging, and situational personalization.

Additionally, because the message data is customized for each subscriber unit 17 according to the data capability profile of that particular unit 17, the information contained in the data fields in the data packet are not required to expand or fill a more arbitrary maximum size thereby keeping to a minimum the message data sent in the data packet for reception by a respective subscriber unit 17. Because the data format, size, and type, can be dynamically changed for each subscriber unit 17 using wireless communication with the server 15, this invention permits conveniently changing any message data to accommodate changing applications in the system 11, such as larger phone numbers, larger aliases, and expanded cross-fleet ID's. As the size of a data entry in a data packet depends on a subscriber unit's data capability profile and not a more arbitrary value, subscriber units 17 receive data packets with message data customized for their particular memory and data storage capability and do not have to ignore excess message data that is not relevant to the particular capability of a subscriber unit 17.

Figure 3:
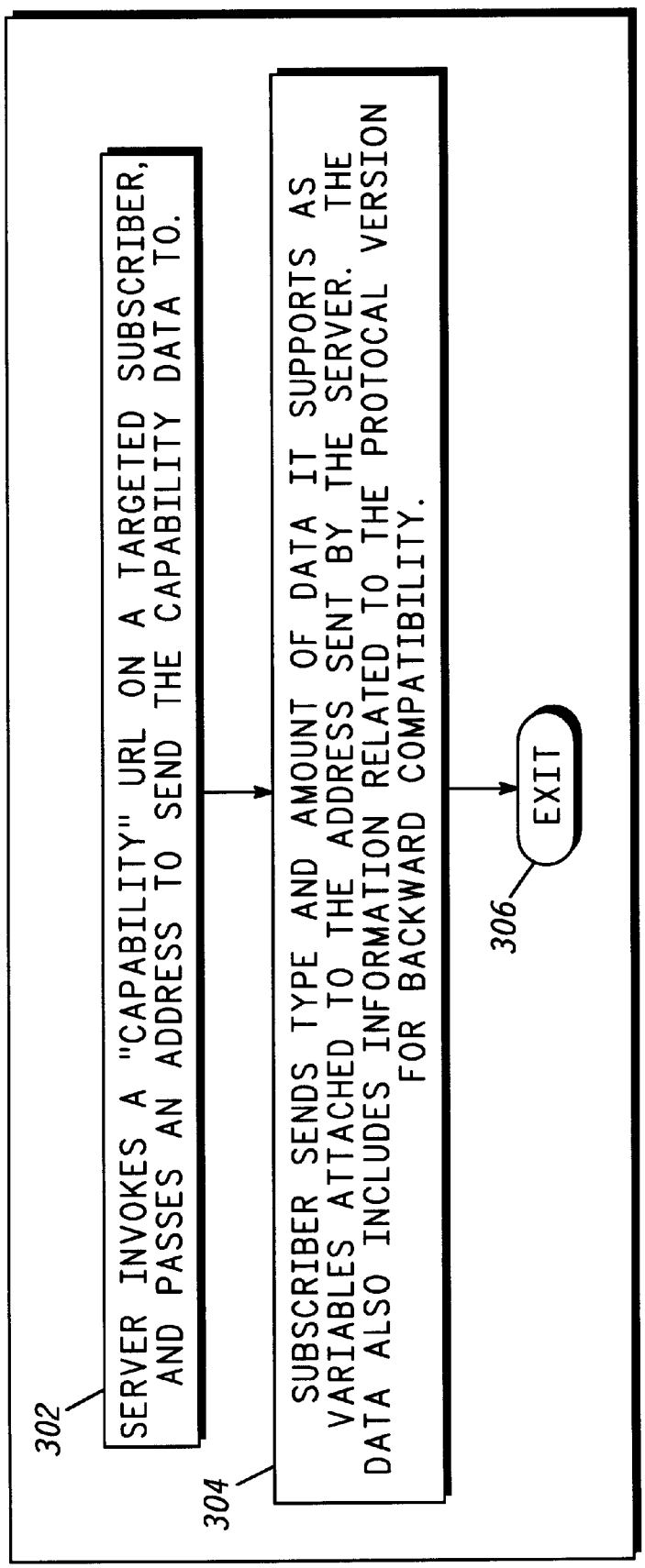
FIG. 3 is a flow diagram showing an exemplary operational sequence to query a subscriber unit for data capability profile in the message communication system of FIG. 1.

An operational sequence for the server 15 querying a subscriber unit 17 is illustrated in FIG. 3, according to a preferred embodiment of the present invention. Once the server 15 determines that it will query a subscriber unit 17, at step 302, the server 15 prepares a query message coupled with the address of the particular subscriber unit 17. The server 15 then forwards the query message to the at least one transceiving basestation 16 to wirelessly transmit the query message into the communication channel and destined for reception by the subscriber unit 17. The subscriber unit 17 receives the query message and, at step 304, prepares a response message that contains information representing the data capability profile of the subscriber unit 17. The information includes information related to the protocol version for backward compatibility. The subscriber unit 17 then transmits the response message to the server 15. The server 15 utilizes the information contained in the response message to update a data capability profile record in a database 32 in the memory 30 in the central station 12. The updated record corresponds to the particular subscriber unit 17. The server 15 then exits the operational sequence, at step 306.

In this way, the server 15 tracks the data capability profile of the subscriber units 17 to 22 that are operating in the communication system 11. A subscriber unit 17 has a corresponding data capability profile stored in a memory at the subscriber unit 17 that can be modified at the subscriber unit 17 during normal operation. For example, a user of the subscriber unit 17 can configure the subscriber unit memory and data structures stored therein to vary the data capability profile of the subscriber unit 17 such as by adding additional fields in data structures, deleting fields, and varying the data content capability of fields. Additionally, for example, the subscriber unit 17 can be upgraded to a larger memory configuration, for example, or for new data protocols that can support additional new data types. In this way, the user of the subscriber unit 17 can modify the data capability of the subscriber unit 17. The user, advantageously, does not have to return the subscriber unit 17 to a central maintenance and support facility for updating the configuration of the data capability profile of the subscriber unit 17. The user can operate the subscriber unit 17 to coordinate a configuration of the data capability profile of the subscriber unit 17 at the unit 17 and at the server 15 using wireless communication between the subscriber unit 17 and the server 15 over a communication channel in a convenient and efficient manner. The query message sequence can be initiated by the server 15 as well as by the subscriber unit 17. The subscriber 17 would initiate a query message sequence by transmitting a request query sequence message to the server 15. The server 15, at an appropriate time, would service the request message, at step 302.

Figure 4:
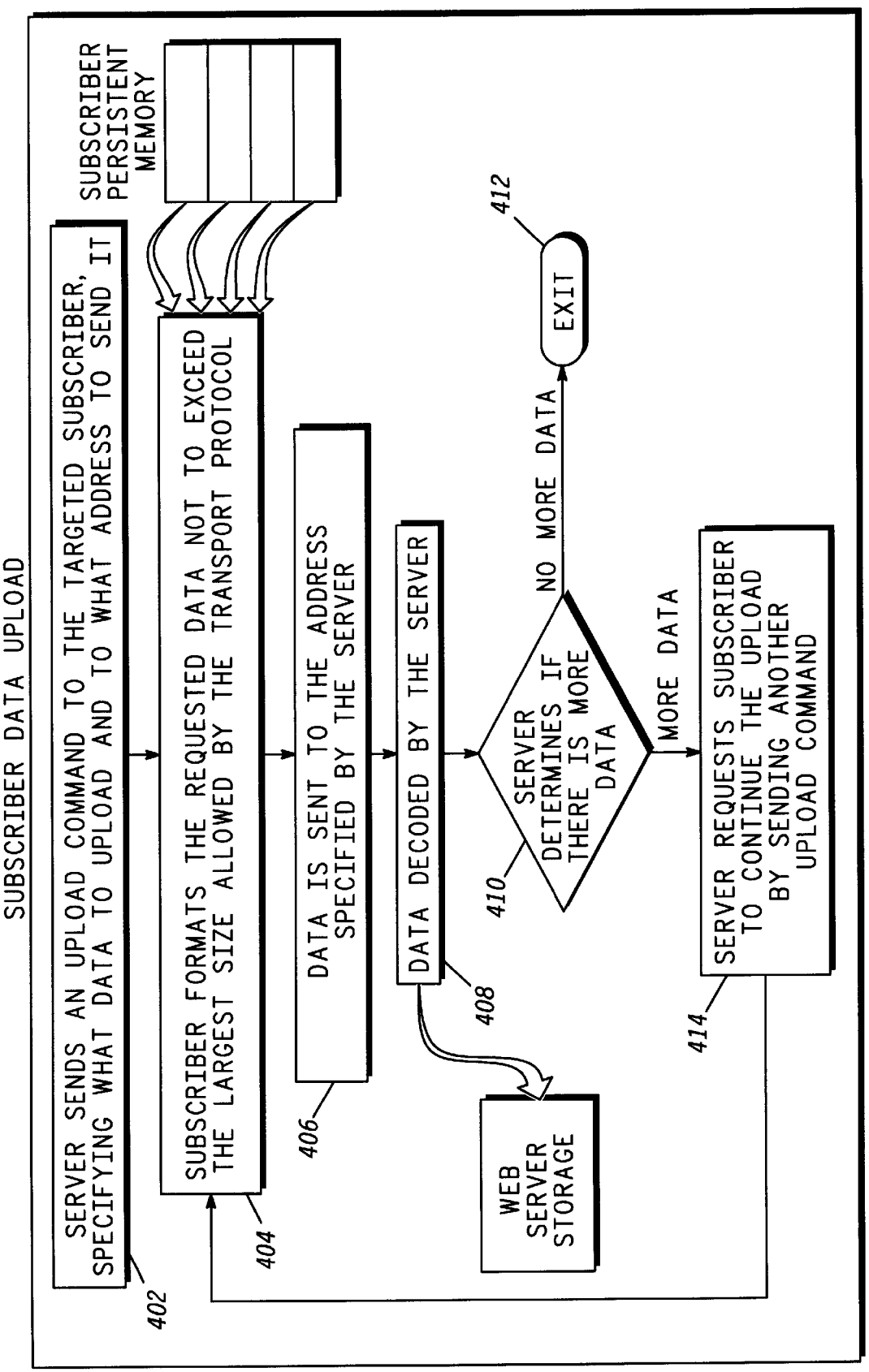
FIG. 4 is a flow diagram showing a second exemplary operational sequence for the message communication system of FIG. 1 illustrating a message delivery from a subscriber unit to a server.

Referring to FIG. 4, the server can upload data from a subscriber unit 17 to the server 15 utilizing the exemplary operational sequence shown. This operation is useful in many applications such as for backup or for data reconciliation with certain applications at the server 15. By maintaining in the server 15 a current copy of the subscriber unit's memory contents, a subscriber unit 17 benefits from the more powerful processing capability and data storage capability of the server 15 for many applications as well as for a backup function in the event that the subscriber unit 17 loses the contents of its memory or possibly the unit 17 itself is lost or destroyed and needs to be replaced. The upload sequence can be initiated by the server 15 or by the subscriber unit 17, depending upon particular application in the communication system 11. For example, a backup sequence may be timed at certain portions of the day where communication activity is low for the communication system 11. The server 15, at the appropriate time, initiates the upload sequence by sending an upload command message to the subscriber unit 17, at step 402. The subscriber unit 17, at step 404, responds by preparing an upload message that conforms to the current datagram for the subscriber unit 17. One or more data packets are transmitted, at steps 406, 408, 410, 412, and 414, from the subscriber unit 17 to the server 15 across the wireless communication channel. The server 15 also contains a current datagram information for the subscriber unit 17 and processes the one or more data packets to recreate the contents of the subscriber unit's memory at the server 15. The server 15 then stores the data from the subscriber unit 17 in a record in a database (not shown) that tracks this information (such as for backing up the information) for the subscriber unit 17 in the communication system 11.

By utilizing a dynamically configurable datagram 200 the server 15 and the subscriber units 17 to 22 in a communication system 11 can efficiently communicate message information across a wireless communication channel. Additionally, a server 15 can communicate with a subscriber unit 17 to query its data capability profile. By transmitting message information according to the data capability profile the subscriber unit 17 does not have to waste resources by processing excess message information. This benefits both the transmission of information from the server 15 to the subscriber units 17 to 22 and the transmission of message information from the subscriber units 17 to 22 to the server 15.

This efficient transmission of message information is a significant benefit of the present invention that has not been available in prior art wireless communication systems. More efficiently utilizing the wireless communication channel during message transmission the communication system can support much more communication traffic and thereby increase the number of subscriber units that can be supported on a particular communication system. This increases the commercial viability of wireless communication systems utilizing the novel dynamically configurable datagram according to the preferred embodiment of the present invention.

Figure 5:
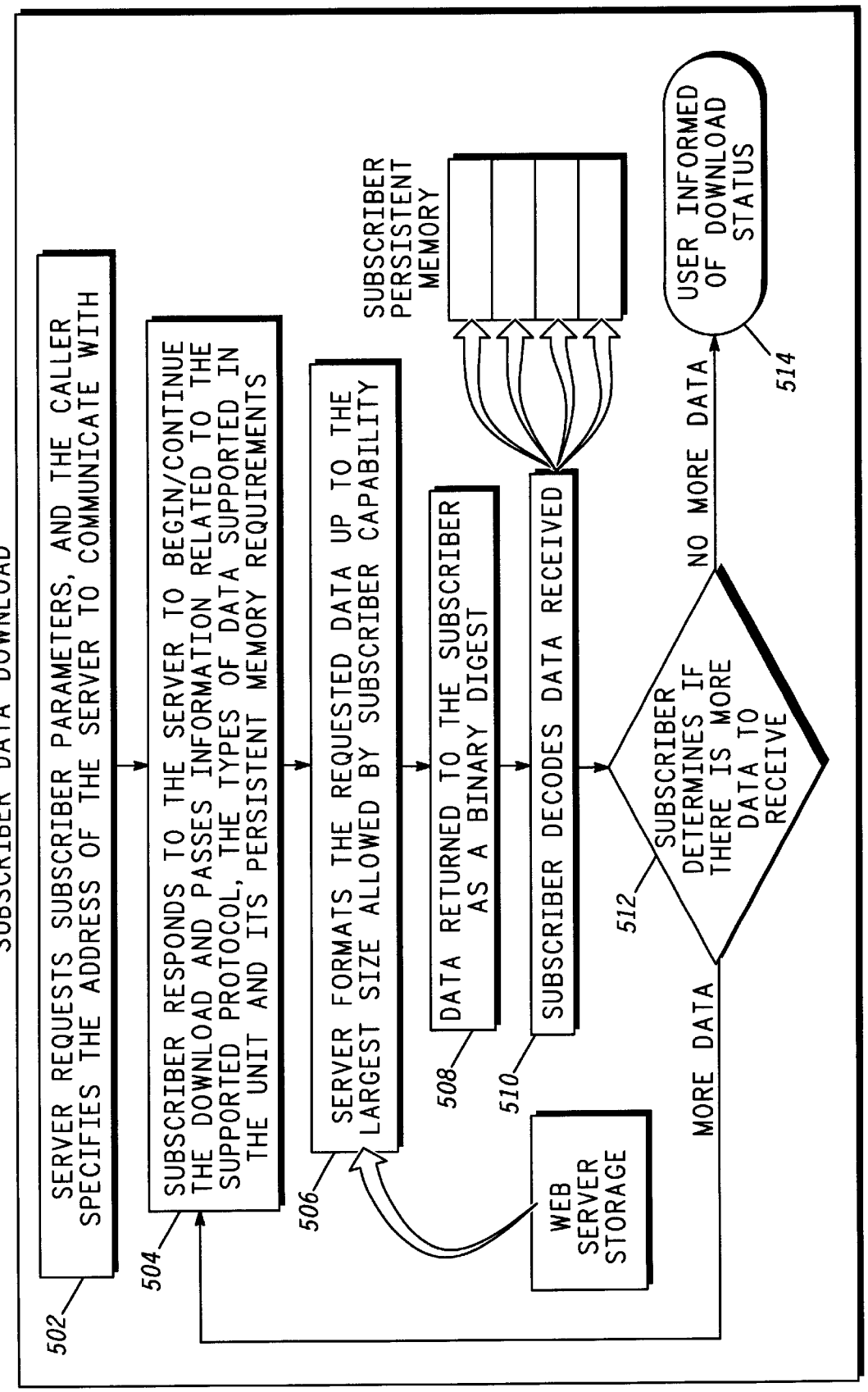
FIG. 5 is a flow diagram showing an exemplary operational sequence for the message communication system of FIG. 1 illustrating a message delivery from a server to a subscriber unit.

Referring to FIG. 5, the data transmission or download, according to the inventive principles as disclosed in connection with the preferred embodiment, is explained. The download can be initiated by in the server sending a request to the subscriber unit 17 for the subscriber parameters, at step 502. The server's address to which the subscriber unit 17 will respond is included as a parameter in the request to the subscriber unit 17. When download communication between the server 15 and the subscriber unit 17 is established, at step 504, the server 15 can transmit message data packets to the subscriber unit 17. In this example, the subscriber unit 17 transmits its data capability profile to the server 15 at step 504 as part of establishing communication between the server 15 and the subscriber unit 17. Once the server has established communication, at step 504, the server 15 can tailor the message data transmission to the data capability profile of each individual subscriber unit 17, at steps 506, 508, 510, 512, and 514. The message data transmitted to the subscriber unit 17, at step 508, may be in the form of a binary digest which is decoded at the subscriber unit 17 and stored in subscriber memory, at step 510. The subscriber unit 17 can signal the server 15 to continue the transmission when there is more data to receive. Information relevant to the download status can be generated for the subscriber. Otherwise, the information may be produced for the subscriber that the data transmission is completed.

Although specific embodiments of the invention have been disclosed, it will be understood by those having ordinary skill in the art that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A wireless communication system for minimizing the data sent between a central server and a subscriber unit, comprising:

a central server for communicating message data with subscriber units according to a dynamically configurable datagram;

a wireless transceiver, communicatively coupled to the central server, for receiving message data from the server and wirelessly transmitting said message data into a communication channel destined for reception by a subscriber unit, and for wireless reception of message data transmitted from a subscriber unit and destined for reception by the central server and thereby forwarding the wirelessly received message data to the central server;

a subscriber unit for communicating message data with the server according to a dynamically configurable datagram, the central server being responsive to a wirelessly transmitted message from the subscriber unit to dynamically configure the dynamically configurable datagram according to a data capability profile of the subscriber unit and thereby customizing a communication of message data between the subscriber unit and the central server according to the data capability of the subscriber unit;

wherein the dynamically configurable datagram is configured to wirelessly communicate message data containing administrative changes for the subscriber unit, and wherein the administrative changes include personalizing the subscriber unit, and wherein the administrative changes include diagnosis of said subscriber unit.

2. The wireless communication system of claim 1 wherein the data capability profile of the subscriber unit indicates at least one of the supported data types at the subscriber unit, the number of data fields for storing in memory at the subscriber unit, the size of each data field for storing in the memory at the subscriber unit, and the data type for each data field.

3. The wireless communication system of claim 1, wherein the dynamically configurable datagram is dynamically configured for wireless transmission of message data from the central server to the subscriber unit.

4. The wireless communication system of claim 1, wherein the dynamically configurable datagram is dynamically configured for wireless transmission of message data from the subscriber unit to the central server.

5. The wireless communication system of claim 1, wherein the dynamically configurable datagram is dynamically configured for transmitting substantially only the message data relevant to the subscriber unit.

6. The wireless communication system of claim 1, wherein the data capability profile indicates a maximum number of data fields for a subscriber unit memory.

7. The wireless communication system of claim 1, wherein the data capability profile indicates a maximum data size for a data field for a subscriber unit.

8. The wireless communication system of claim 1, wherein the data capability profile indicates a memory storage configuration for the subscriber unit.

9. The wireless communication system of claim 1, wherein the dynamically configurable datagram identifies a data protocol type for wireless communication of message data.

10. The system of claim 1, wherein the administrative changes include changing a data transmission protocol for the subscriber unit.

* * * * *